United States Patent
Wakabayashi et al.

(10) Patent No.: US 12,124,536 B2
(45) Date of Patent: Oct. 22, 2024

(54) IMAGE RECOGNITION TRAINING DATA QUALITY ENHANCEMENT

(71) Applicant: International Business Machines Corporation, Armonk, NY (US)

(72) Inventors: Takehiro Wakabayashi, Tokyo (JP); Shingo Nagai, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 17/539,330

(22) Filed: Dec. 1, 2021

(65) Prior Publication Data
US 2023/0169149 A1 Jun. 1, 2023

(51) Int. Cl.
*G06F 18/214* (2023.01)
*G06T 5/40* (2006.01)
*G06T 7/90* (2017.01)

(52) U.S. Cl.
CPC ........... *G06F 18/2148* (2023.01); *G06T 5/40* (2013.01); *G06T 7/90* (2017.01); *G06T 2207/20092* (2013.01)

(58) Field of Classification Search
CPC ..... G06F 18/214; G06F 18/2148; G06T 5/40; G06T 7/90; G06T 2207/20092; G06V 10/774–7753
See application file for complete search history.

(56) References Cited

U.S. PATENT DOCUMENTS

| | | |
|---|---|---|
| 2019/0019052 A1 | 1/2019 | Pao |
| 2019/0205794 A1 | 7/2019 | Hsu |
| 2020/0272854 A1* | 8/2020 | Caesar ................... G06N 20/20 |
| 2021/0158195 A1 | 5/2021 | Giovannini |
| 2021/0256420 A1 | 8/2021 | Oren |
| 2022/0398859 A1* | 12/2022 | Botros ............... G06V 10/7715 |

OTHER PUBLICATIONS

"Get started with Tensorflow Data Validation", TFX, <https://www.tensorflow.org/tfx/data_validation/get_started>, Last updated Apr. 20, 2021, 9 pages.
"LabelImg", github, <https://github.com/tzutalin/labelImg>, printed Aug. 30, 2021, 6 pages.
Barla, Annalisa, Francesca Odone, and Alessandro Verri. "Histogram intersection kernel for image classification." Proceedings 2003 international conference on image processing (Cat. No. 03CH37429). vol. 3. IEEE, 2003, 4 pages.

(Continued)

*Primary Examiner* — Casey L Kretzer
(74) *Attorney, Agent, or Firm* — James Olsen

(57) ABSTRACT

A training dataset including a plurality of labeled images can be received, each labeled image of the plurality of labeled images including a label represented by a bounding box having a designated class name. Characteristics of each label can be obtained. Statistical information for each class name of the plurality of labeled images can be determined based on the characteristics of each label associated with each respective class name. An outlier test can be performed based on the determined statistical information for a first designated class name to receive at least one outlier label having the first designated class name. The at least one outlier label can be output as a modification candidate for re-labeling.

15 Claims, 10 Drawing Sheets

(56) References Cited

OTHER PUBLICATIONS

Grubbs, Frank E. (1950). "Sample criteria for testing outlying observations". Annals of Mathematical Statistics. 21 (1): 27-58.
Lin, Tsung-Yi, et al. "Microsoft coco: Common objects in context." European conference on computer vision. Springer, Cham, 2014, 15 pages.
Mell et al., "The NIST Definition of Cloud Computing", NIST, National Institute of Standards and Technology, Special Publication 800-145, Sep. 2011, 7 pages.
Parkhi et al., "The Oxford-IIIT Pet Dataset", Visual Geometry Group—University of Oxford, <https://www.robots.ox.ac.uk/~vgg/data/pets/>, printed Nov. 3, 2021, 3 pages.
Sheng, Victor S., Foster Provost, and Panagiotis G. Ipeirotis. "Get another label? improving data quality and data mining using multiple, noisy labelers." Proceedings of the 14th ACM SIGKDD international conference on Knowledge discovery and data mining. 2008.

\* cited by examiner

IMAGE RECOGNITION TRAINING DATA QUALITY ENHANCEMENT

BACKGROUND

The present disclosure relates generally to the field of image recognition, and in particular, to improving training data used in object detection models.

Object detection models are configured to analyze images to classify (e.g., identify) one or more objects within each image. Various approaches to object detection exist. Deep learning approaches to object detection are typically based on convolutional neural networks (CNNs). Objection detection models can be used in various applications, including object tracking, feature detection, vehicle counting, image annotation, and others.

SUMMARY

Embodiments of the present disclosure are directed to a method, system, and computer program product for image recognition training data enhancement. A training dataset including a plurality of labeled images can be received, each labeled image of the plurality of labeled images including a label represented by a bounding box having a designated class name. Characteristics of each label can be obtained. Statistical information for each class name of the plurality of labeled images can be determined based on the characteristics of each label associated with each respective class name. An outlier test can be performed based on the determined statistical information for a first designated class name to receive at least one outlier label having the first designated class name. The at least one outlier label can be output as a modification candidate for re-labeling.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
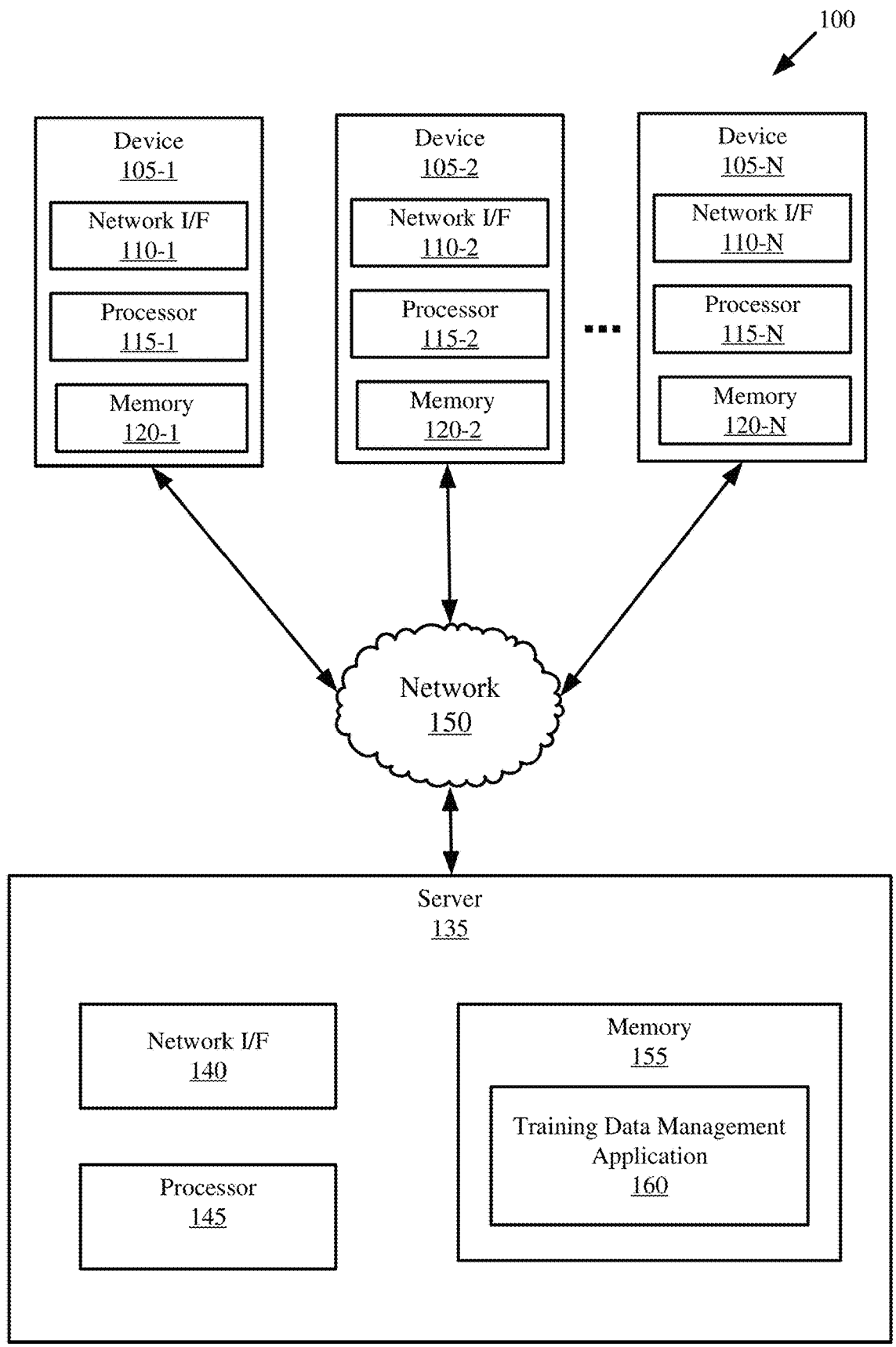
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to image recognition, and in particular, to improving training data used in objection detection models. While the present disclosure is not necessarily limited to such applications, various aspects of the disclosure can be appreciated through a discussion of various examples using this context.

In the field of image recognition, deep learning (e.g., implementing neural networks) has been used for object detection to identify the location and class of objects within images. To create an object detection model, labeling of objects within bounding boxes (e.g., rectangular bounding boxes) in images can be used as a training dataset. The model can be generated by iteratively learning with the labeled training data such that the prediction error decreases. However, there can be various issues that arise when training an object detection model using training data. For example, model accuracy can decrease when the labels include objects other than the target object, when the label range is too wide, when the label range is too narrow, and/or when objects are mistakenly labeled. Accurate and uniform labeling can increase the accuracy of object detection models. However, it can be difficult to control label quality variation when labeling a large number of images. It takes a lot of time and effort to manually check labels (e.g., one by one by a human reviewer).

Aspects of the present disclosure relate to enhancement of training data used in image recognition models. A training dataset including a plurality of labeled images can be received, each labeled image of the plurality of labeled images including a label represented by a bounding box having a designated class name. Characteristics of each label can be obtained. Statistical information for each class name of the plurality of labeled images can be determined based on the characteristics of each label associated with each respective class name. An outlier test can be performed based on the determined statistical information for a first designated class name to receive at least one outlier label having the first designated class name. The at least one outlier label can be output as a modification candidate for re-labeling.

There are various advantages to enhancing training data of image recognition models. By enhancing label quality (e.g., via re-labeling of labels within a training dataset), models used for object detection may be more accurate. Further, aspects of the present disclosure allow for more accurate identification of label outliers within training data. Further still, aspects of the present disclosure preserve computing resources (e.g., memory and processing power) by ensuring only accurate labels describing classes are considered when training image recognition models. For example, one or more labels which were inaccurate and previously considered by an image recognition model may consume unnecessary computing resources.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., virtual reality software, browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 9

The server 135 includes a training data management application 160. The training data management application 160 can be configured to enhance training data quality (e.g., label quality) within image recognition models (e.g., convolutional neural networks). Further, the training data management application 160 can be configured to modify parameters used to determine outliers within training data and to modify numerical ranges used to make modification proposals. This can be completed based on proposed label modifications and received user feedback.

The training data management application 160 can be configured to receive a dataset including labeled images. In embodiments, the dataset can further include videos comprising a plurality of frames, where each frame contains one or more labels. Upon receiving the dataset including labeled images, the training data management application 160 can be configured to determine characteristics of each label corresponding to each class within each image. Determined label characteristics include, among others, size of label bounding boxes, aspect ratio (e.g., width to height ratio) of label bounding boxes, and color histograms (e.g., red green blue (RGB) pixel frequency graphs) of bounding boxes.

Upon determining characteristics of labels (e.g., of bounding boxes designating the label including a set of pixels within the image), statistical information associated with each class (e.g., label name) can be determined. Determining statistical information can include calculating averages, medians, ranges, outliers, and other statistical indicators associated with each class based on the totality of label characteristics associated with each respective class. For example, for a first label class (e.g., dog), an average label bounding box size, an average label bounding box aspect ratio, and average bounding box RGB histograms can be calculated. Tolerated heights/widths, aspect ratios, and RGB histograms can be determined based on a particular threshold (e.g., 1 standard deviation) from the average. In this context, tolerated can refer to a range in which a particular label characteristic is not considered an outlier. In embodiments, tolerated label bounding box size, aspect ratio, and/or RGB color histograms can be calculated using an outlier test (e.g., Grubb's test).

Figure 2:
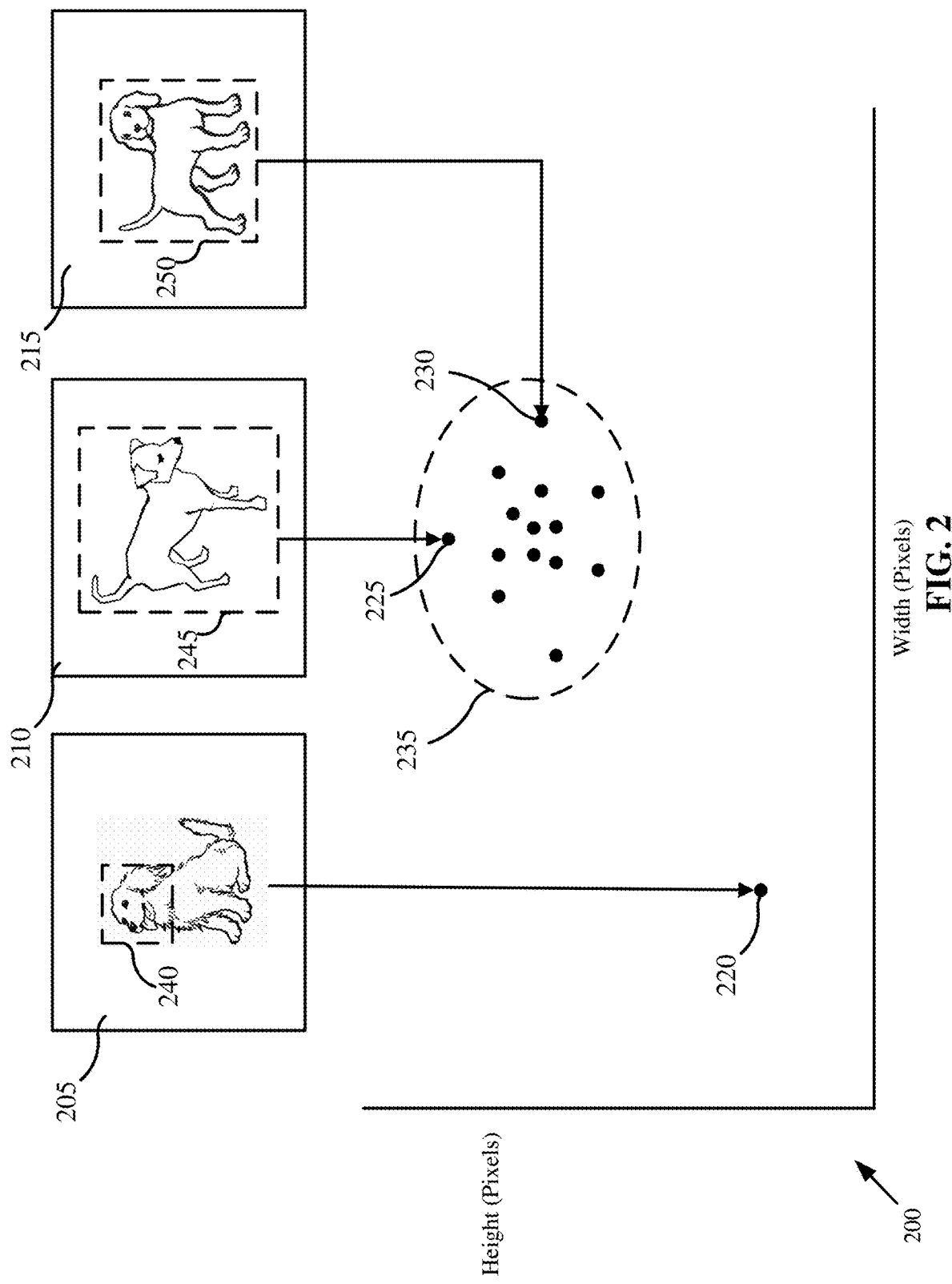
FIG. 2 is a diagram illustrating an outlier test based on label bounding box size, in accordance with embodiments of the present disclosure.
Figure 3:
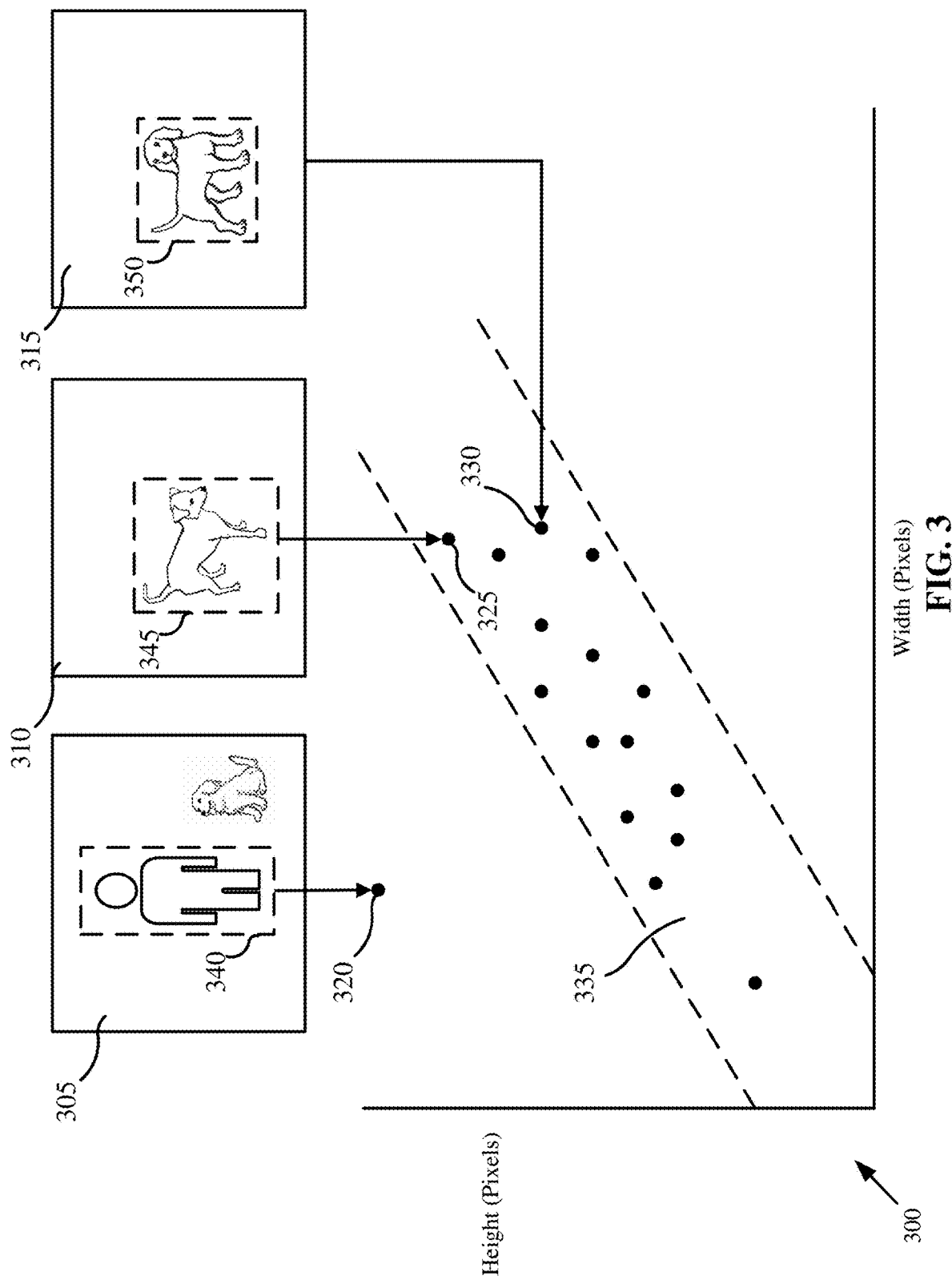
FIG. 3 is a diagram illustrating an outlier test based on label bounding box aspect ratio, in accordance with embodiments of the present disclosure.
Figure 4:
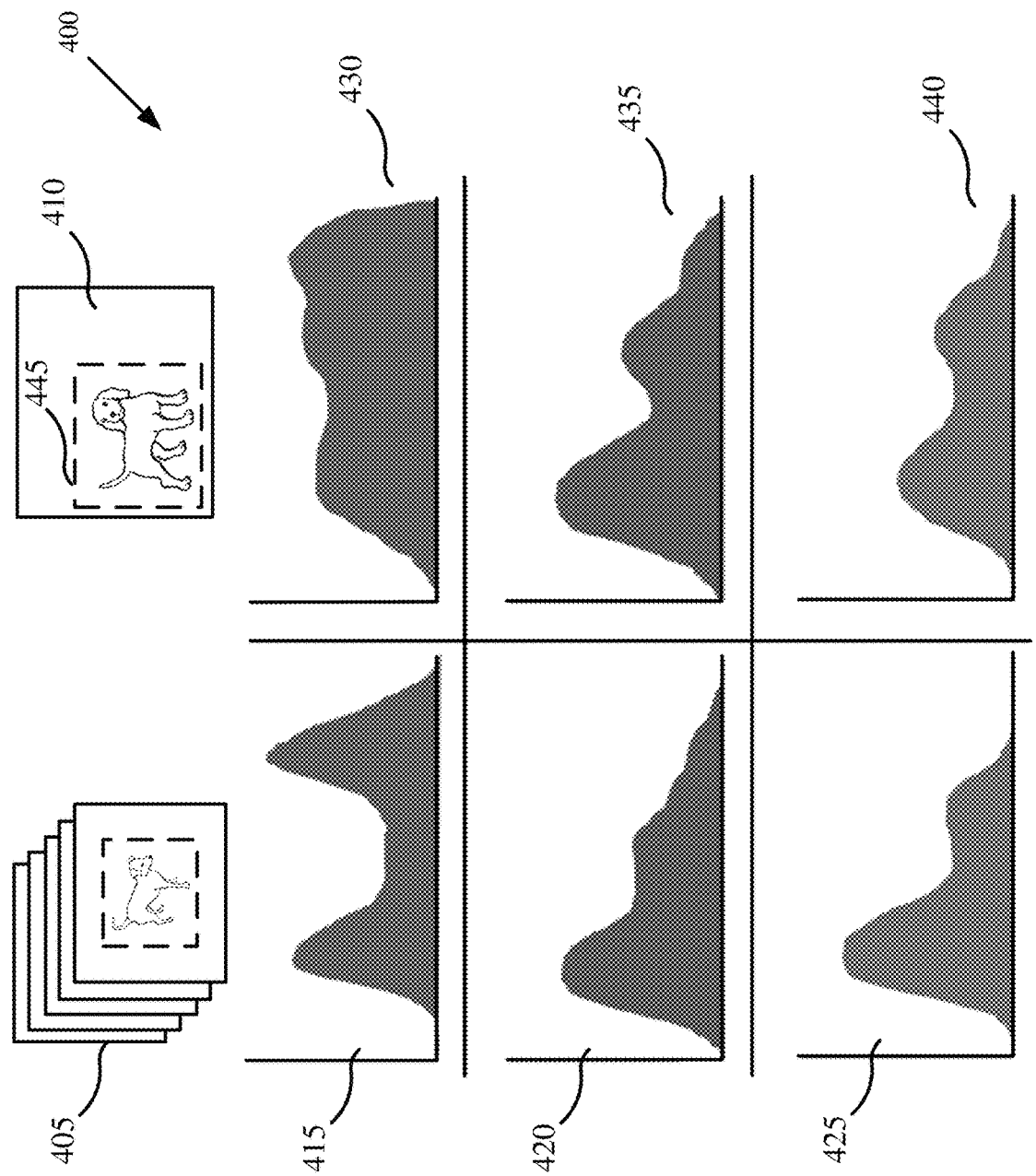
FIG. 4 is a diagram illustrating an outlier test based on label bounding box red green blue (RGB) histogram distributions, in accordance with embodiments of the present disclosure.

Thereafter, outliers within each label class can be determined. Outliers refer to calculated label characteristic data points that significantly differ from other observations (e.g., than an average value, than an acceptable range, etc.). Outliers can be determined based on label characteristics (e.g., based on bounding box size, based on label bounding box aspect ratio, and/or based on label bounding box RBG histograms) and determined statistical information (e.g., averages, standard deviations, medians, ranges, etc.) using outlier tests. Running each outlier test on the dataset of images can output a set of outlier label bounding boxes based on label bounding box size, aspects ratio, and/or RGB histograms. An example outlier test for label bounding box size is depicted in FIG. 2. An example outlier test for label bounding box aspect ratio is depicted in FIG. 3. An example outlier test for label bounding box RBG histograms is depicted in FIG. 4.

Upon determining label bounding box outliers using one or more of the above-referenced outlier tests, the outliers can be output as modification candidates. Modification candidates refer to label bounding boxes that are selected as prospective bounding boxes to be modified/re-labeled (e.g., automatically or based on user feedback). In embodiments, modification proposals can be automatically generated by modifying characteristics of respective bounding boxes such that they are within a threshold range (e.g., a standard deviation) from an average (e.g., within a pixel size range or within a pixel aspect ratio range from an average value). The modification proposals can be transmitted to a user such that the user can determine whether to accept or deny each modification proposal.

In embodiments, if the user accepts the proposed modification, the range used for the modification proposal can be modified such that it is closer to the average value (e.g., the range can be changed from two standard deviations from an average to one standard deviation from an average). This is because if the user accepts the proposed modification, it can indicate that the range used to make the proposed modification is accurate and thus can be made narrower.

In embodiments, if the user does not accept the proposed modification, and rather makes a customized change which is outside the range, then the range used to make the proposed modification can be expanded (e.g., the range can be changed from one standard deviation from an average to two standard deviations from an average value). This is because if the user rejects the proposed modification and makes a customized change which is outside the range, then the range for generating proposed modifications may not be accurate and thus can be expanded.

In embodiments, if the user does not accept the proposed modification and does not make any changes, then parameters used for outlier detection (e.g., the factors used within each outlier test) can be updated. This is because if the user simply accepts the original bounding box output by the image recognition model, then it should not be considered an outlier.

In embodiments, if the user rejects (e.g., deletes) a given label bounding box rather than accepting a proposed modification, then no changes may be made to the range from the average used to make proposed modification nor to the parameters used for outlier detection.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Referring now to FIG. 2, shown is a diagram depicting an example outlier test based on label bounding box size, in accordance with embodiments of the present disclosure. As shown in FIG. 2, three images within a dataset are shown and plotted on a scatter plot 200 mapping pixel width versus pixel height of various images. A first image 205 includes a first label bounding box 240 having a first label bounding box size 220 (e.g., depicted as a datapoint within scatter plot 200). A second image 210 includes a second label bounding box 245 having a second label bounding box size 225. A third image 215 includes a third label bounding box 250 having a third label bounding box size 230. The example images can be labeled using any suitable object detection algorithm (e.g., region based convolutional neural networks, single shot multibox detector (SSD), you only look once (YOLO), retina-net, deformable convolutional networks). In some embodiments, the example images can be labeled manually (e.g., by a human reviewer). The images in FIG. 2 can be automatically identified as the class "dog" using the object detection algorithm. As depicted in FIG. 2, the object detection algorithm mistakenly only captured the dog's head within the first label bounding box 240.

As depicted in FIG. 2, a tolerated height/width range 235 is depicted as a dashed circle. The tolerated height/width range 235 can be determined using any suitable method. For example, the tolerated height/width range 235 can be determined using z-score, probabilistic and statistical modeling, linear regression models, proximity based models, and other methods. In embodiments, Grubb's test can be used to determine the tolerated height/width range 235.

In the example depicted in FIG. 2, a variety of data points, including the second label bounding box size 225 and the third label bounding box size 230, are included within the tolerated height/width range 235. As an example, the second label bounding box size 225 may have pixel width of 500 and a pixel height of 600 (e.g., 500, 600) and the third label bounding box size 230 may have a pixel width of 600 and a height of 500 (e.g., 600, 500). The tolerated height/width range 235 may be from 400-800 pixels wide and from 400-700 pixels high with an elliptical shape.

The first label bounding box size 220 may have a pixel width of 200 and a pixel height of 150 (e.g., 200, 150), and thus may outside of the tolerated height/width range 235. Thus, using this example outlier test, the first label bounding box size 220 may be determined to be an outlier and thus may be selected as a modification candidate. The modification candidate can then have its label bounding box size altered (e.g., automatically or manually) to capture the full object based on a proposed modification and received user feedback.

Referring now to FIG. 3, shown is a diagram depicting an example outlier test based on label bounding box aspect ratio, in accordance with embodiments of the present disclosure. As shown in FIG. 3, three images within a dataset are shown and plotted on a scatter plot 300 mapping pixel width versus pixel height of various images. A first image 305 includes a first label bounding box 340 having a first label bounding box size 320 (e.g., depicted as a datapoint within scatter plot 300). A second image 310 includes a second label bounding box 345 having a second label bounding box size 325. A third image 215 includes a third label bounding box 350 having a third label bounding box size 330. The example images can be labeled using any suitable object detection algorithm (e.g., region based convolutional neural networks, single shot multibox detector (SSD), you only look once (YOLO), retina-net, deformable convolutional networks). In some embodiments, the example images can be labeled manually (e.g., by a human reviewer). The images in FIG. 3 can be automatically identified as the class "dog" using the object detection algorithm. As depicted in FIG. 3, the object detection algorithm mistakenly captured a human as the class "dog."

As depicted in FIG. 3, a tolerated aspect ratio range 335 is depicted as an area encompassed between two dashed lines. The tolerated aspect ratio range 335 can be determined using any suitable method. For example, the aspect ratio range 335 can be determined using z-score, probabilistic and statistical modeling, linear regression models, proximity based models, and other methods. In embodiments, Grubb's test can be used to determine the tolerated aspect ratio range 335.

In the example depicted in FIG. 3, a variety of data points, including the second label bounding box size 325 and the third label bounding box size 330, are included within the tolerated aspect ratio range 335. As an example, the second label bounding box size 325 may have pixel width of 500 and a pixel height of 600 (e.g., 500, 600) and the third label bounding box size 330 may have a pixel width of 500 and a height of 500 (e.g., 500, 500). The tolerated aspect ratio range 335 may only allow label bounding box sizes of a particular aspect ratio (e.g., 4:3, 16:9, 3:2, etc.) or may only allow a particular pixel variation between the height and width (e.g., 200 pixels) of the label bounding box size.

The first label bounding box size 320 may have a pixel width of 200 and a pixel height of 700 (e.g., 200, 700), and thus may be outside of the tolerated aspect ratio range 335. Thus, using this example outlier test, the first label bounding box size 320 may be determined to be an outlier and thus may be selected as a modification candidate. The modification candidate can then have its label bounding box size altered (e.g., automatically or manually) to capture the correct object based on a proposed modification and received user feedback.

Referring now to FIG. 4, shown is a diagram 400 depicting an example outlier test based on red green blue (RGB) histograms, in accordance with embodiments of the present disclosure. A set of images 405 may have an average red histogram distribution 415, an average green histogram distribution 420, and an average blue histogram distribution 425 for pixels within captured label bounding boxes across the set of images 405. Each respective histogram represents the frequency of each color channel (e.g., the frequency of pixels of each corresponding color channel having a luminance range of 0-255). Thus, the horizontal axis in each color histogram ranges from 0-255 while the vertical axis in each color histogram represents frequency.

An image 410 has a red histogram distribution 430, a green histogram distribution 435, and a blue histogram distribution 440 calculated based on pixels within label bounding box 445. The histograms of the image 410 shown on the right can be compared to the average histograms shown on the left to determine whether the label bounding box 445 within the image 410 is an outlier. Determining whether the label bounding box 445 is an outlier can be determined using any suitable outlier methods depicted above. For example, if the red histogram distribution 430 significantly differs (e.g., more than one standard deviation) from the average red histogram distribution 415, then a determination can be made that the label bounding box 445 is an outlier.

It is noted that any suitable threshold can be set for determining whether the label bounding box 445 is an outlier. In embodiments, if any of the red histogram distribution, green histogram distribution, or blue histogram distribution of a label bounding box differs from their respective average histograms for a given class from a threshold amount, a determination can be made that the label bounding box having a histogram distribution which exceeds a threshold difference between an average histogram distribution is an outlier.

Using this example outlier test, the label bounding box 445 may be determined to be an outlier (e.g., based on the red histogram distribution 430 significantly differing from the average red histogram distribution 415) and thus may be selected as a modification candidate. The modification candidate can then have its label bounding box altered to better capture the object based on a proposed modification and received user feedback.

Figure 5:
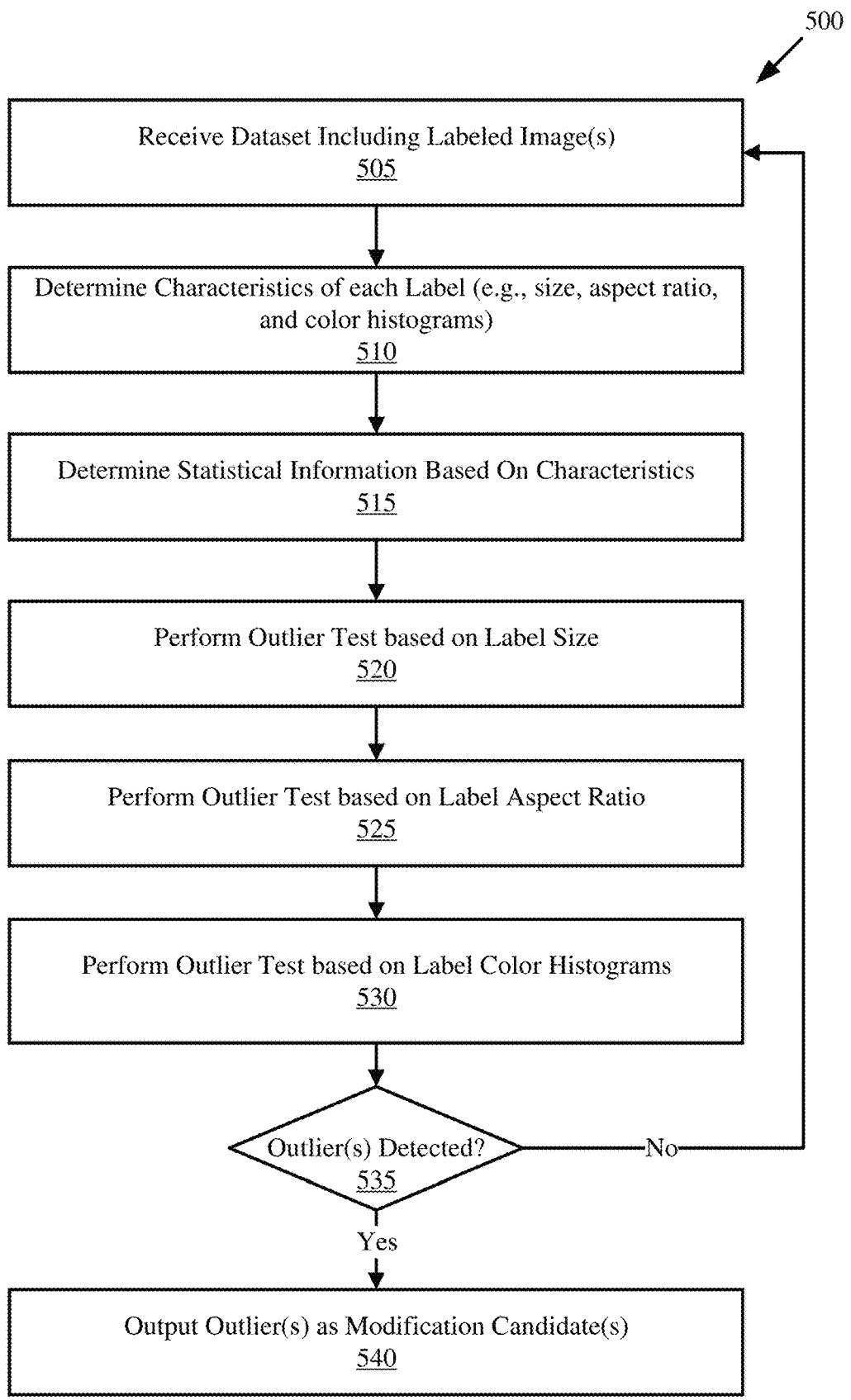
FIG. 5 is a flow-diagram illustrating an example method for image recognition training data enhancement, in accordance with embodiments of the present disclosure.

Referring now to FIG. 5, shown is a flow-diagram illustrating an example method 500 for enhancing image recognition training data, in accordance with embodiments of the present disclosure. One or more operations of method 500 can be completed by one or more computing devices (e.g., devices 105 and/or server 135).

Method 500 initiates at operation 505, where a dataset including labeled images is received. The images can be labeled with bounding boxes designating particular class names. Any suitable image recognition (e.g., object detection) algorithm can be implemented to obtain labels, including, but not limited to region based convolutional neural networks (R-CNNs), single shot multibox detector (SSD), you only look once (YOLO), retina-net, and deformable convolutional networks. In some embodiments, the images can be labeled manually (e.g., by a human reviewer). Further, any suitable number of labeled images can be labeled with any suitable number of labels (e.g., one image can have multiple label bounding boxes designating respective classes).

Method 500 then proceeds to operation 510, where characteristics of each label are determined. The characteristics can include, among other characteristics, label bounding box size (e.g., pixel height and width of bounding boxes), label bounding box aspect ratio (e.g., ratio of width pixels to height pixels of the bounding box), and RGB histograms for each label bounding box. Data associated with each class across the images can be organized or structured together (e.g., in a table).

Statistical information is then determined, for each class, based on the label characteristics. This is illustrated at operation 515. Statistical information can include statistical indicators (e.g., means, medians, ranges, distributions, standard deviations, and other statistical indicators) calculated across a dataset of labels for each class based on the label characteristics determined at operation 510. For example, for a first class, "dog," statistical indicators can include average label bounding box size, average label bounding box aspect ratio, and average RGB histograms across a plurality of "dog" labels. Further statistical indicators can include tolerated ranges for bounding box size, aspect ratio, and RGB histograms. For example, standard deviations can be computed for each label class based on bounding box size, aspect ratio, and RGB histograms, and the standard deviations can be set as the tolerated range (e.g., 1 standard deviation from a mean label bounding box size can be set as a tolerated range). However, any suitable threshold (e.g., from a mean value) can be set for the tolerated range. Statistical information can include any patterns and/or values gleaned by analyzing two or more labels of a given class.

An outlier test is then performed based on label size. This is illustrated at operation 520. The outlier test performed on label size can be completed in the same, or a substantially similar manner, as described with respect to FIG. 2. For example, a tolerated label size range can be computed (e.g., tolerated height/width range 235) and any label bounding boxes falling outside of the tolerated label size range can be defined as outliers. It is noted that any suitable method for determining outliers based on pixel size can be completed without departing from the spirit and scope of the present disclosure.

An outlier test is then performed based on label aspect ratio. This is illustrated at operation 525. The outlier test performed on label aspect ratio can be completed in the same, or a substantially similar manner, as described with respect to FIG. 3. For example, a tolerated label aspect ratio range can be computed (e.g., tolerated aspect ratio range 335) and any label bounding boxes falling outside of the tolerated label size range can be defined as outliers. It is noted that any suitable method for determining outliers based on pixel aspect ratio can be completed without departing from the spirit and scope of the present disclosure.

An outlier test is then performed based on label RGB histograms. This is illustrated at operation 530. The outlier test performed on label RGB histograms can be completed in the same, or a substantially similar manner, as described with respect to FIG. 4. For example, average red, green, and blue histogram distributions can be calculated for a given class and any label bounding boxes of the class having red, green, and/or blue histogram distributions exceeding a threshold difference from the average red, green, and/or blue histogram distributions can be defined as an outlier. It is noted that any suitable method for determining outliers based on RGB histograms can be completed without departing from the spirit and scope of the present disclosure.

A determination is then made whether any outliers are detected. This is illustrated at operation 535. For example, by running one or more of the above outlier tests based on label size, label aspect ratio, and/or label RGB histogram distributions, a determination can be made whether there are any outliers output by the outlier test(s). If there are outliers, then the outliers can be output as modification candidates. This is illustrated at operation 540. Modification candidates refer to label bounding boxes that may be prospectively designated for modification (e.g., by changing the bounding box size, aspect ratio, or location within an image). For example, a modification candidate can be re-labeled by applying a different bounding box to the same class within the image. In embodiments, the method 500 continues by proceeding to operation 705 of method 700.

The aforementioned operations can be completed in any order and are not limited to those described. Additionally, some, all, or none of the aforementioned operations can be completed, while still remaining within the spirit and scope of the present disclosure. For example, in embodiments, only one of the outlier tests of operations 520-530 may be completed.

Figure 6:
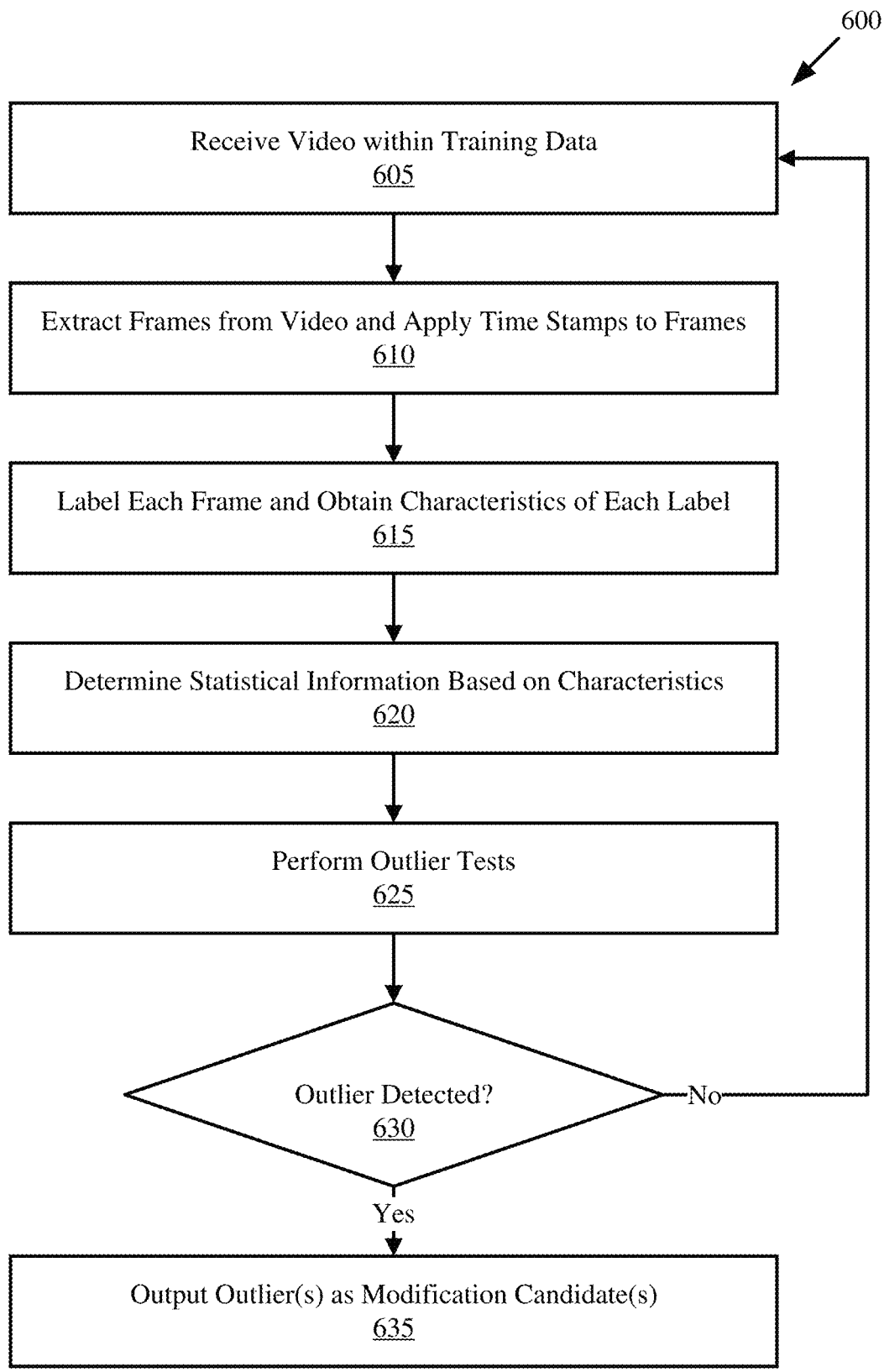
FIG. 6 is a flow-diagram illustrating an example method for image recognition training data enhancement where the training data includes a video, in accordance with embodiments of the present disclosure.

Referring now to FIG. 6, shown is a flow-diagram illustrating an example method 600 for enhancing image recognition training data where the training data includes a video, in accordance with embodiments of the present disclosure. One or more operations of method 600 can be completed by one or more computing devices (e.g., devices 105 and/or server 135).

Method 600 initiates at operation 605, where a video is received within training data. The video can be of any suitable format (e.g., gif, FLV, WebM, etc.) and can comprise a plurality of frames (e.g., individual images). The frames are extracted from the video and time stamps are applied to the frames. This is illustrated at operation 610.

Each of the frames are then labeled and characteristics of each label are determined. This is illustrated at operation 615. Any suitable image recognition (e.g., object detection) algorithm can be implemented to determine labels of frames within videos, including, but not limited to region based convolutional neural networks (R-CNNs), single shot multibox detector (SSD), you only look once (YOLO), retinanet, and deformable convolutional networks. In some embodiments, the frames can be labeled manually (e.g., by a human reviewer). Further, any suitable number of frames within the video can be labeled with any suitable number of labels (e.g., one image can have multiple label bounding boxes designating respective classes).

Statistical information is then determined based on the label characteristics. This is illustrated at operation 620. Determining statistical information for each class of labels can be completed in the same, or a substantially similar manner, as operation 515 of FIG. 5. For example, statistical indicators such as means, medians, ranges, distributions, and standard deviations can be calculated across a dataset of labels for each class based on the determined label characteristics.

Outlier tests are then performed for each class of labels. This is illustrated at operation 625. The outlier tests can be the same as, or substantially similar to, the outlier tests described with respect to FIGS. 2-4 and with respect to operations 520-530 of method 500. The parameters for outlier detection (e.g., average values and tolerated ranges) can vary without departing from the spirit and scope of the present disclosure.

A determination is then made whether any outliers are detected. This is illustrated at operation 630. For example, by running one or more of the above outlier tests based on label size, label aspect ratio, and/or label RGB histogram distributions, a determination can be made whether there are any outliers output by the outlier test(s). If there are outliers, then the outliers can be output as modification candidates. This is illustrated at operation 635. Modification candidates refer to label bounding boxes that may be prospectively designated for modification (e.g., by changing the bounding box size, aspect ratio, or location within an image). For example, a modification candidate can be re-labeled by applying a different bounding box to the same class within the image. In embodiments, the method 600 continues by proceeding to operation 705 of method 700.

In embodiments, at operation 630, a determination can be made whether an outlier exists within temporally continuous labels. Temporally continuous labels are those of which are within a threshold time period (e.g., within a threshold time stamp range) of each other within the video. For example, a threshold can be set such that any labels occurring within the same 10 seconds, 1 minute, 30 minutes, etc. are defined as "temporally continuous." Thus, in embodiments, statistical information, at operation 620, can be calculated within each set of temporally continuous labels for outlier detection.

As an example, if a temporally continuous set of 20 frames of a video contains a frame which includes a label size which significantly differs (e.g., beyond two standard deviations) from the average label size within the 20 frames of the video, a determination can be made that the label associated with the label size is an outlier within the temporally continuous set of labels. This can be completed based on label bounding box size, aspect ratio, and/or RGB histograms for any suitable temporal interval.

The aforementioned operations can be completed in any order and are not limited to those described. Additionally, some, all, or none of the aforementioned operations can be completed, while still remaining within the spirit and scope of the present disclosure.

Figure 7:
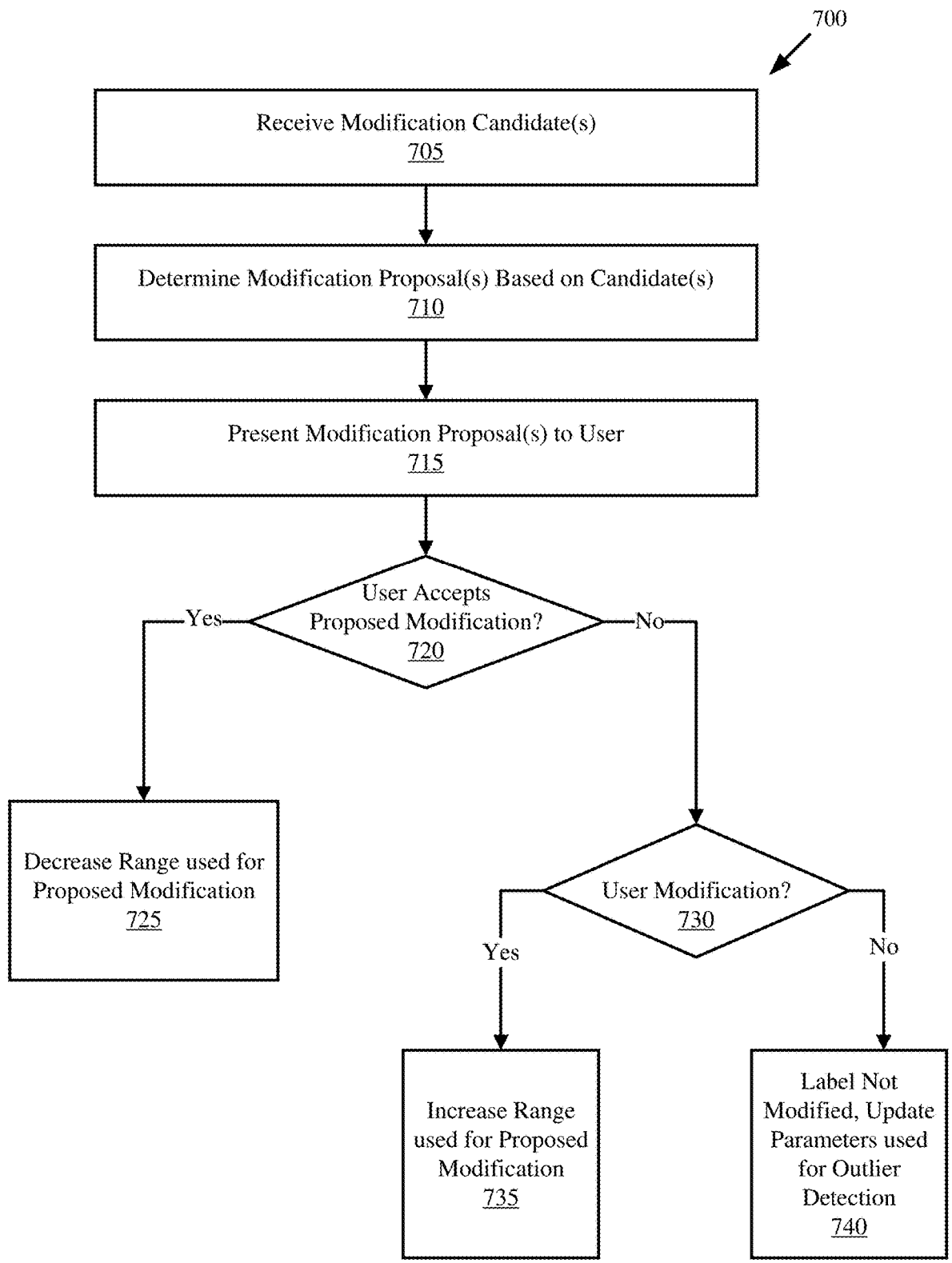
FIG. 7 is a flow-diagram illustrating an example method for processing proposed modification of labels, in accordance with embodiments of the present disclosure.

Referring now to FIG. 7, shown is a flow-diagram illustrating an example method 700 for processing proposed modification candidates, in accordance with embodiments of the present disclosure. One or more operations of method 700 can be completed by one or more computing devices (e.g., devices 105 and/or server 135).

Method 700 initiates at operation 705, where modification candidate(s) are received. The modification candidates can be received from operations 540 and/or 635 of methods 500 and 600 respectively.

Modification proposals are then determined for each modification candidate. This is illustrated at operation 710. Determining the modification proposal can include altering the label bounding box characteristics based on a range encompassing an average bounding box characteristic value (e.g., based on a tolerated range). For example, referring to the outlier depicted in FIG. 2, the first label bounding box size 220 can be altered such that it falls within the tolerated height/width range 235 (e.g., the height and width of the bounding box can be increased). As another example, referring to FIG. 3, the first label bounding box size 320 can be altered such that it falls within the tolerated aspect ratio range 335 (e.g., the height of the pixel can be decreased). However, modification proposals can be completed in any suitable manner (e.g., bounding box characteristics can be shifted to an average characteristic value).

The modification proposal(s) determined at operation 710 are then presented to a user. This is illustrated at operation 715. A determination is then made whether the user accepts the proposed modification. This is illustrated at operation 720. If the user accepts the proposed modification, then a range used to make the proposed modification is decreased. This is illustrated at operation 725. This can be completed as if the user accepts the proposed modification, then the range used to make the proposed modification is accurate and thus can be narrowed (e.g., the range can be honed in for accuracy).

If the user does not accept the proposed modification at operation 720, a determination is made whether the user issued a customized modification. This is illustrated at operation 730. For example, the user may not accept the proposed modification but instead edit the modification in a customized manner (e.g., outside of the range used to make the proposed modification). If the user makes a customized modification (e.g., outside of the range used to make the proposed modification), then the range used to make the proposed modification can be expanded. This is illustrated at operation 735. This can be completed as if the user enters a customized modification which is outside of the range used to make the proposed modification, then the range used to make the proposed modification may be inaccurate and may need to be expanded.

If the user does not make any modifications to the label, then the parameters used for outlier detection are updated. This is illustrated at operation 740. For example, because the user did not accept any changes to the label which was assumed to be an outlier requiring re-labeling, this means the label should not have been considered an outlier. Thus, the parameters for outlier detection can be altered (e.g., such that label which the user did not modify is not detected as an outlier anymore).

The aforementioned operations can be completed in any order and are not limited to those described. Additionally, some, all, or none of the aforementioned operations can be completed, while still remaining within the spirit and scope of the present disclosure.

Figure 8:
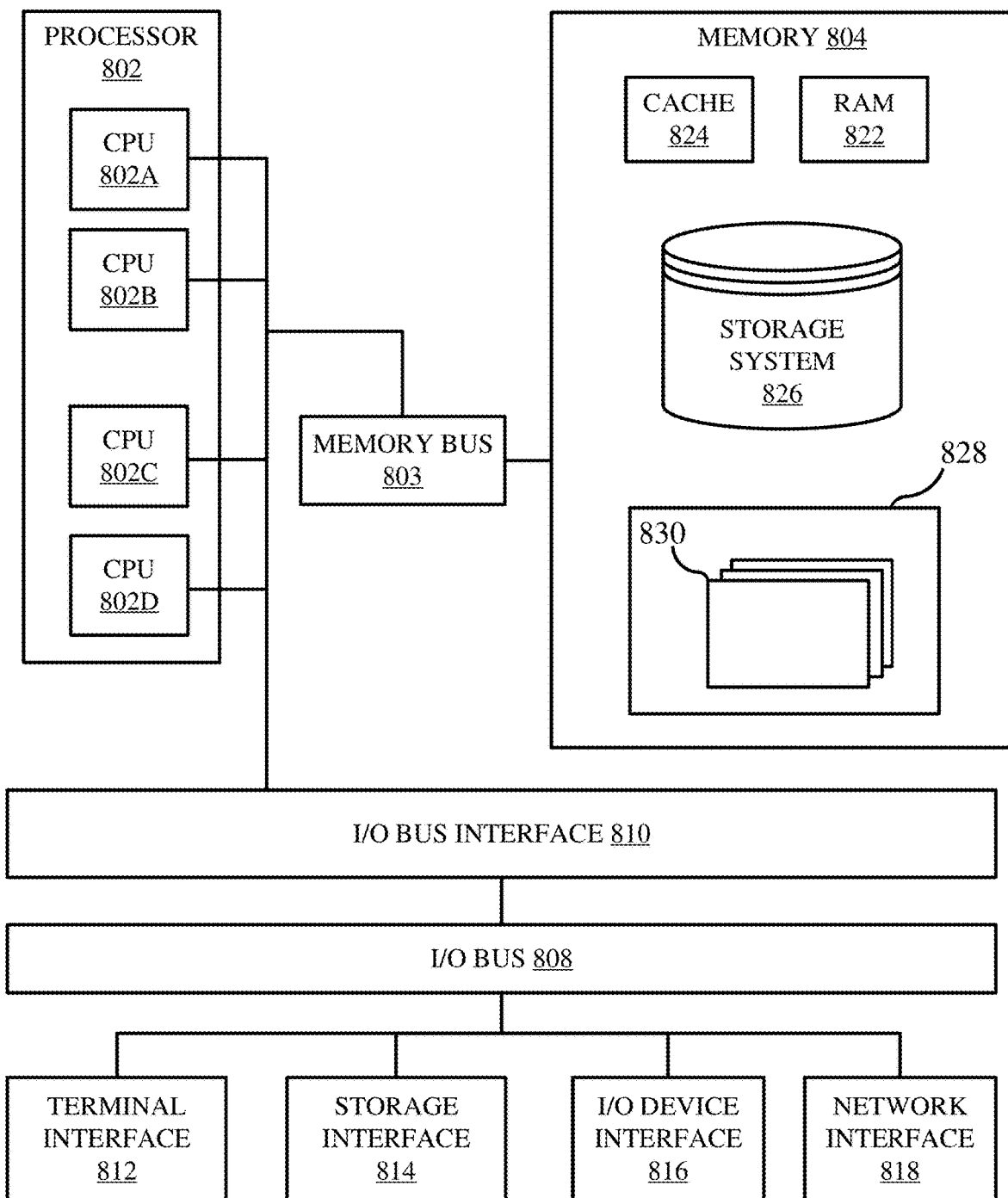
FIG. 8 is a high-level block diagram illustrating an example computer system that can be used in implementing one or more of the methods, tools, modules, and any related functions described herein, in accordance with embodiments of the present disclosure.

Referring now to FIG. 8, shown is a high-level block diagram of an example computer system 801 that may possibly be utilized in various devices discussed herein (e.g., devices 105 and server 135) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802 (also referred to as processors herein), a memory 804, a terminal interface 812, a storage interface 814, an I/O (Input/Output) device interface 816, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

Memory 804 may include computer system readable media in the form of volatile memory, such as random-access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
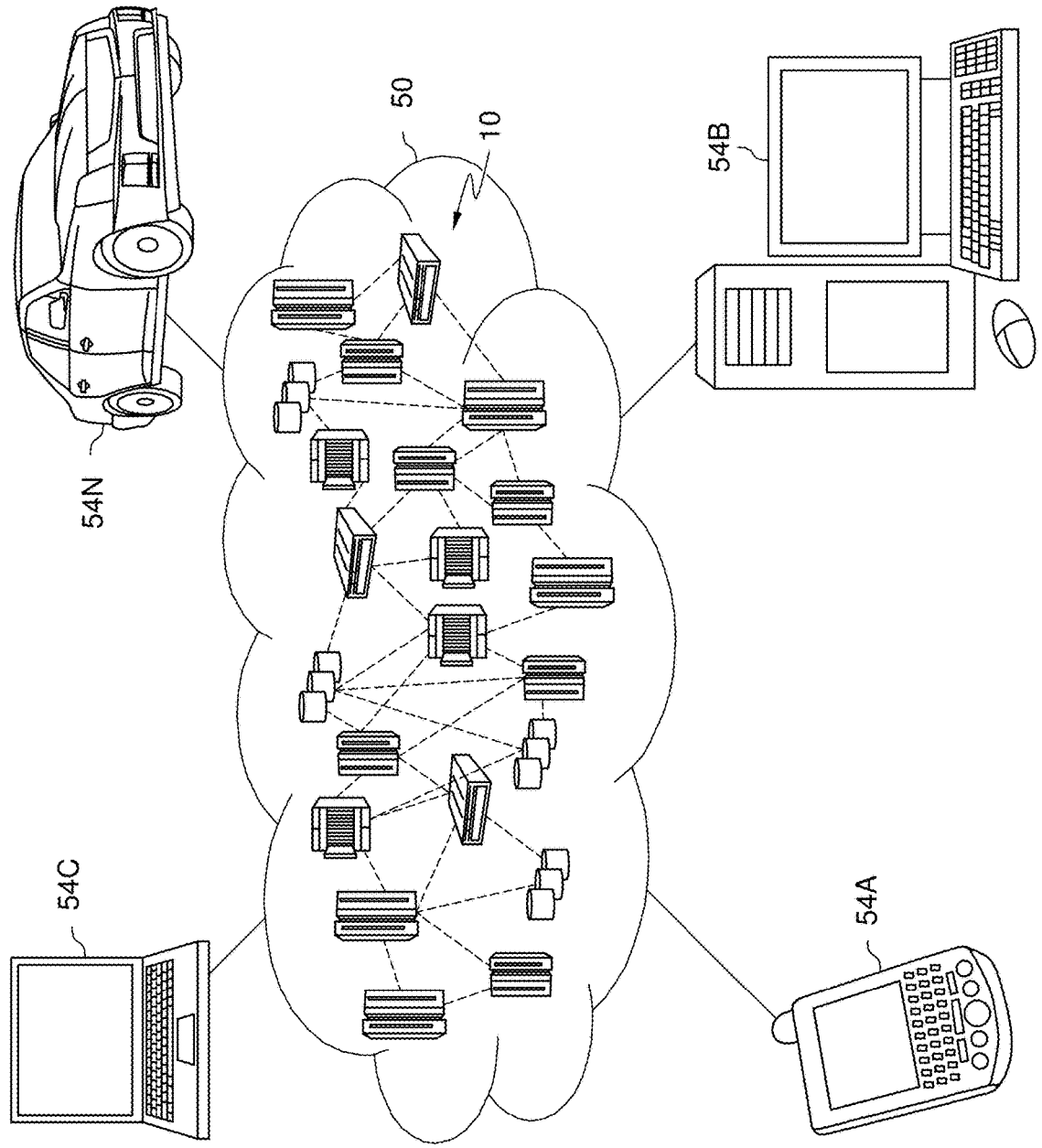
FIG. 9 is a diagram illustrating a cloud computing environment, in accordance with embodiments of the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
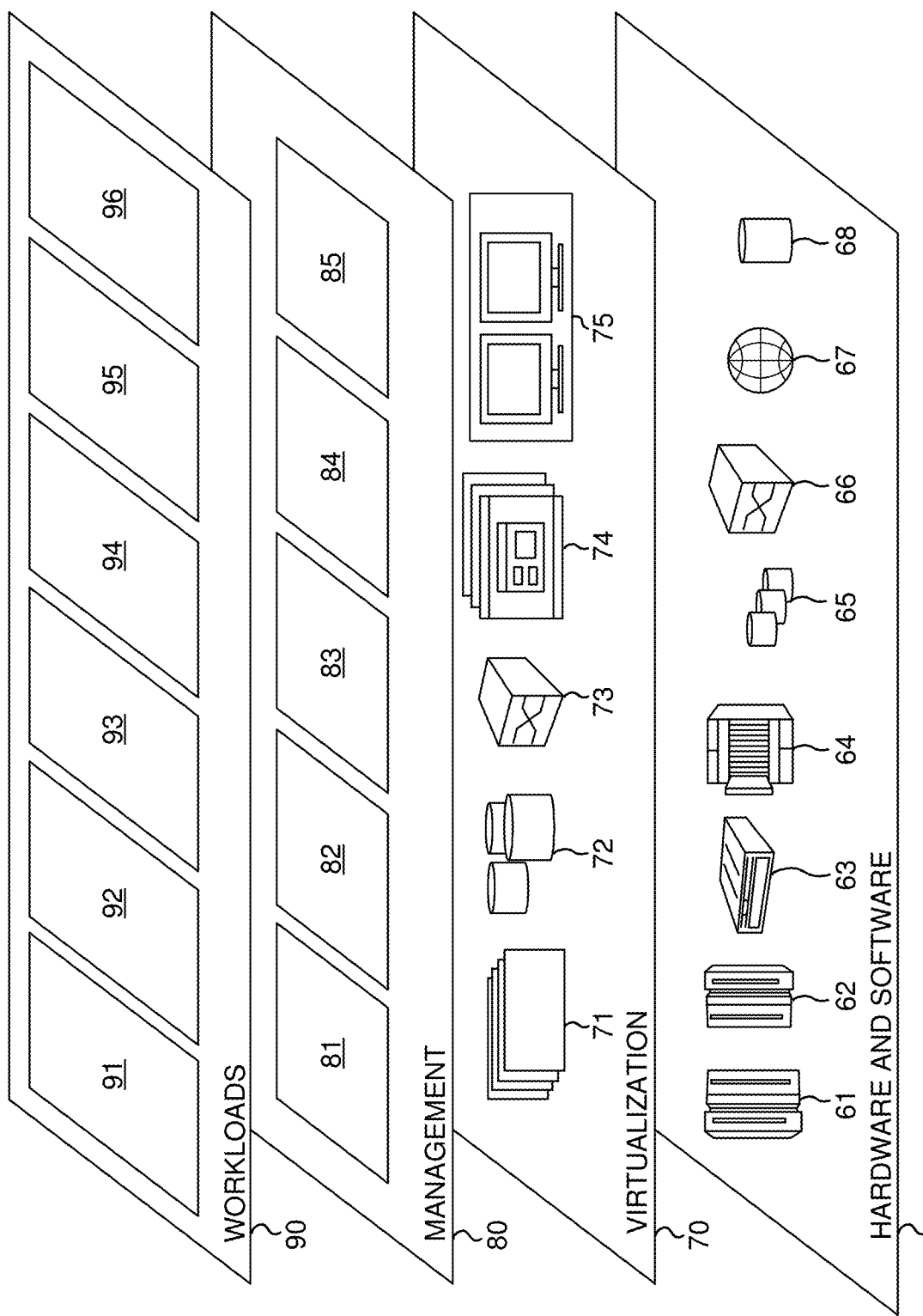
FIG. 10 is a block diagram illustrating abstraction model layers, in accordance with embodiments of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and training data quality enhancement 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
    receiving a training dataset including a plurality of labeled images, respective ones of labeled images of the plurality of labeled images including a label represented by a bounding box having a designated class name;
    obtaining characteristics of respective ones of the labels;
    determining statistical information for respective ones of the class names of the plurality of labeled images based on the characteristics of each label associated with each respective class name;
    performing an outlier test based on the determined statistical information for a first designated class name to receive at least one outlier label having the first designated class name;

receiving a modification of the at least one outlier label to obtain at least one modified label, wherein the modification alters the at least one outlier label to be within a range encompassing an average value of a label characteristic; and training an object detection model using the at least one modified label.

2. The method of claim 1, wherein obtaining characteristics of each label includes determining a size of each label, determining an aspect ratio of each label, and determining red green blue (RGB) histograms of each label.

3. The method of claim 2, wherein determining statistical information includes determining a tolerated label size range, determining a tolerated label aspect ratio range, and determining a tolerated RGB histogram range, wherein the outlier test is completed by comparing the outlier label to each of the tolerated label size range, the tolerated label aspect ratio range, and the tolerated RGB histogram range.

4. The method of claim 1, further comprising, prior to receiving the modification of the at least one outlier label:
presenting the modification of the at least one outlier label as a proposed label modification to a user.

5. The method of claim 4, further comprising:
receiving acceptance of the proposed label modification from the user; and
narrowing the range encompassing the average value used to alter the at least one outlier label.

6. A system comprising:
one or more processors; and
one or more computer-readable storage media collectively storing program instructions which, when executed by the one or more processors, are configured to cause the one or more processors to perform a method comprising:
receiving a training dataset including a plurality of labeled images, respective ones of labeled images of the plurality of labeled images including a label represented by a bounding box having a designated class name;
obtaining characteristics of respective ones of the labels;
determining statistical information for respective ones of the class names of the plurality of labeled images based on the characteristics of each label associated with each respective class name;
performing an outlier test based on the determined statistical information for a first designated class name to receive at least one outlier label having the first designated class name;
receiving a modification of the at least one outlier label to obtain at least one modified label, wherein the modification alters the at least one outlier label to be within a range encompassing an average value of a label characteristic; and
training an object detection model using the at least one modified label.

7. The system of claim 6, wherein obtaining characteristics of each label includes determining a size of each label, determining an aspect ratio of each label, and determining red green blue (RGB) histograms of each label.

8. The system of claim 7, wherein determining statistical information includes determining a tolerated label size range, determining a tolerated label aspect ratio range, and determining a tolerated RGB histogram range, wherein the outlier test is completed by comparing the outlier label to each of the tolerated label size range, the tolerated label aspect ratio range, and the tolerated RGB histogram range.

9. The system of claim 6, wherein the method performed by the one or more processors further comprises, prior to receiving the modification of the at least one outlier label:
presenting the modification of the at least one outlier label as a proposed label modification to a user.

10. The system of claim 9, wherein the method performed by the one or more processors further comprises:
receiving acceptance of the proposed label modification from the user; and
narrowing the range encompassing the average value used to alter the at least one outlier label.

11. A computer program product comprising one or more computer readable storage media, and program instructions collectively stored on the one or more computer readable storage media, the program instructions comprising instructions configured to cause one or more processors to perform a method comprising:
receiving a training dataset including a plurality of labeled images, respective ones of labeled images of the plurality of labeled images including a label represented by a bounding box having a designated class name;
obtaining characteristics of respective ones of the labels;
determining statistical information for respective ones of the class names of the plurality of labeled images based on the characteristics of each label associated with each respective class name;
performing an outlier test based on the determined statistical information for a first designated class name to receive at least one outlier label having the first designated class name;
receiving a modification of the at least one outlier label to obtain at least one modified label, wherein the modification alters the at least one outlier label to be within a range encompassing an average value of a label characteristic; and
training an object detection model using the at least one modified label.

12. The computer program product of claim 11, wherein obtaining characteristics of each label includes determining a size of each label, determining an aspect ratio of each label, and determining red green blue (RGB) histograms of each label.

13. The computer program product of claim 12, wherein determining statistical information includes determining a tolerated label size range, determining a tolerated label aspect ratio range, and determining a tolerated RGB histogram range, wherein the outlier test is completed by comparing the outlier label to each of the tolerated label size range, the tolerated label aspect ratio range, and the tolerated RGB histogram range.

14. The computer program product of claim 11, wherein the method performed by the one or more processors further comprises, prior to receiving the modification of the at least one outlier label:
presenting the modification of the at least one outlier label as a proposed label modification to a user.

15. The computer program product of claim 14, wherein the method performed by the one or more processors further comprises:
receiving acceptance of the proposed label modification from the user; and
narrowing the range encompassing the average value used to alter the at least one outlier label.

* * * * *